(12) United States Patent
Takai et al.

(10) Patent No.: US 11,657,634 B2
(45) Date of Patent: May 23, 2023

(54) CONTROL SYSTEM, CONTROL METHOD, AND PROGRAM

(71) Applicant: TOYOTA JIDOSHA KABUSHIKI KAISHA, Toyota (JP)

(72) Inventors: Tomohisa Takai, Nagoya (JP); Yuhei Yamaguchi, Toyota (JP); Satoshi Toyoshima, Okazaki (JP); Yuta Watanabe, Toyota (JP); Tetsuya Taira, Nagakute (JP); Mikio Honda, Toyota (JP); Shiro Oda, Anjo (JP); Nobuhisa Otsuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 336 days.

(21) Appl. No.: 17/096,183

(22) Filed: Nov. 12, 2020

(65) Prior Publication Data
US 2021/0157318 A1     May 27, 2021

(30) Foreign Application Priority Data

Nov. 25, 2019    (JP) .............................. JP2019-212383

(51) Int. Cl.
*G05D 1/00*      (2006.01)
*G06V 40/10*      (2022.01)
(Continued)

(52) U.S. Cl.
CPC ............ *G06V 40/10* (2022.01); *G05D 1/0088* (2013.01); *G05D 1/0223* (2013.01);
(Continued)

(58) Field of Classification Search
CPC .. G05D 1/0088; G05D 1/0223; G05D 1/0231; G06V 10/56; G06V 40/10; G06V 20/10
See application file for complete search history.

(56) References Cited

U.S. PATENT DOCUMENTS 9,026,301 B2    5/2015   Zini et al.
2001/0056544 A1*   12/2001   Walker ................ B60W 50/029
                                                              180/170

(Continued)

FOREIGN PATENT DOCUMENTS

JP        2008-200770 A     9/2008
JP        2013-131100 A     7/2013
(Continued)

*Primary Examiner* — Khoi H Tran
*Assistant Examiner* — Tien Minh Le
(74) *Attorney, Agent, or Firm* — Oliff PLC

(57) ABSTRACT

A control system controls an operation mode of a mobile robot that autonomously moves in a predetermined area, and includes a feature detection unit, a classifying unit, and a system controller. The feature detection unit detects features of a person who is present in the vicinity of the mobile robot. The classifying unit classifies the person into a predetermined first group or a predetermined second group based on the features. The system controller selects a first operation mode when the person who belongs to the first group is present in the vicinity of the mobile robot and selects a second operation mode that is different from the first operation mode when the person who belongs to the first group is not present in the vicinity of the mobile robot, thereby controlling the mobile robot.

8 Claims, 9 Drawing Sheets

(51) Int. Cl.
  *G05D 1/02* (2020.01)
  *G06V 20/10* (2022.01)
  *G06V 10/82* (2022.01)
  *G06V 10/44* (2022.01)
  *G06V 10/50* (2022.01)

(52) U.S. Cl.
  CPC ......... *G05D 1/0231* (2013.01); *G06V 10/454* (2022.01); *G06V 10/50* (2022.01); *G06V 10/82* (2022.01); *G06V 20/10* (2022.01)

(56) References Cited

U.S. PATENT DOCUMENTS

| | | | |
|---|---|---|---|
| 2008/0201014 A1 | 8/2008 | Sonoura | |
| 2018/0276471 A1 | 9/2018 | Shibata et al. | |
| 2018/0364045 A1* | 12/2018 | Williams | G01S 17/88 |
| 2020/0053324 A1* | 2/2020 | Deyle | G05D 1/0088 |
| 2020/0273345 A1* | 8/2020 | Mangal | G06Q 10/06 |

FOREIGN PATENT DOCUMENTS

| | | |
|---|---|---|
| JP | 2018-156597 A | 10/2018 |
| JP | 2019-139716 A | 8/2019 |

* cited by examiner

T10

| STAFF CATEGORY | COLOR OF CLOTHING | GROUP CLASSIFICATION | OPERATION MODE |
|---|---|---|---|
| NON-STAFF | UNSPECIFIED | FIRST GROUP (N1) | FIRST OPERATION MODE (NON-STAFF MODE) |
| PHARMACIST | YELLOW | SECOND GROUP (N2) | SECOND OPERATION MODE (STAFF MODE) |
| NURSE | VIOLET | | |

| OPERATION CATEGORY | FIRST OPERATION MODE (NON-STAFF MODE) | SECOND OPERATION MODE (STAFF MODE) |
|---|---|---|
| MOVING SPEED | V1 | V2 |
| ELEVATOR | CANNOT GET ON | CAN GET ON |

Fig. 6

| OPERATION CATEGORY | FIRST OPERATION MODE (NON-STAFF MODE) | SECOND OPERATION MODE (STAFF MODE) | THIRD OPERATION MODE (SECOND STAFF MODE) |
|---|---|---|---|
| MOVING SPEED | V1 | V2 | V1 |
| ELEVATOR | CANNOT GET ON | CAN GET ON | CAN GET ON |

CONTROL SYSTEM, CONTROL METHOD, AND PROGRAM

CROSS REFERENCE TO RELATED APPLICATIONS

This application is based upon and claims the benefit of priority from Japanese patent application No. 2019-212383, filed on Nov. 25, 2019, the disclosure of which is incorporated herein in its entirety by reference.

BACKGROUND

The present disclosure relates to a control system, a control method, and a program.

The development of autonomous moving apparatuses that autonomously move in certain buildings and facilities has been advancing. By equipping such an autonomous moving apparatus with a parcel carrier or towing a cart, it can be used as an automatic delivery apparatus that automatically delivers parcels. The automatic delivery apparatus can deliver, for example, a parcel loaded at a starting place to a destination by autonomously traveling from the starting point to the destination.

For example, an automatic delivery apparatus disclosed in U.S. Pat. No. 9,026,301 includes an autonomously movable tractor part and a parcel carrier part. Further, a computer provided in them stores electronic maps of floor plans of buildings and routes that the automatic delivery apparatus follows when it moves from one place to the next place. The above-described automatic delivery apparatus conveys various objects by using parcel carrier parts of different types depending on the purpose.

SUMMARY

A system (conveyance system) in which the aforementioned autonomous mobile robot conveys conveyed objects is operated, for example, in a predetermined facility such as a hotel, a hospital, and a restaurant. A mobile robot used in such a facility may pass through an environment in which both an operator (staff member) of the facility and a user (non-staff member) of the facility are present. The staff member in the facility can know in advance an action that the mobile robot may take. On the other hand, the non-staff member does not know the action that the mobile robot may take. Therefore, the motion of the mobile robot under the aforementioned environment needs to be reduced assuming that the non-staff member is present in this environment. On the other hand, it is desired to operate the mobile robot more efficiently.

The present disclosure has been made in order to solve the above-described problem and provides a control system and the like that preferably set the operation of the mobile robot in accordance with the surrounding environment.

A control system according to one aspect of the present disclosure controls an operation mode of a mobile robot that autonomously moves in a predetermined area and includes a feature detection unit, a classifying unit, and a system controller. The feature detection unit detects features of a person who is present in the vicinity of the mobile robot. The classifying unit classifies the person into a predetermined first group or a predetermined second group based on the features. The controller selects a first operation mode when the person who belongs to the first group is present in the vicinity of the mobile robot and selects a second operation mode that is different from the first operation mode when the person who belongs to the first group is not present in the vicinity of the mobile robot, thereby controlling the mobile robot.

With this configuration, the control system controls the operation mode of the mobile robot in accordance with the persons who are present in the vicinity of the mobile robot. Accordingly, the mobile robot performs operations different from one another in accordance with the surrounding environment.

The aforementioned control system may further include a camera configured to capture images of the surrounding environment and generate image data, and the feature detection unit may detect the features of the person from the image data generated by the camera. Accordingly, the control system is able to detect the person who is present in the vicinity of the mobile robot from the image data.

In the aforementioned control system, the camera may be provided in a position that is separated from the mobile robot so as to capture images of the surrounding environment. Accordingly, the control system is able to objectively capture images of the area in the vicinity of the mobile robot, whereby it is possible to reduce blind spots.

In the aforementioned control system, the classifying unit may classify the person in accordance with features of clothing of the person. Accordingly, the control system is able to easily classify persons.

In the aforementioned control system, the feature detection unit may detect a color tone in a predetermined part of the clothing of the person, and the classifying unit may classify the person in accordance with the color tone. Accordingly, the control system is able to easily classify persons.

In the aforementioned control system, a first moving speed of the mobile robot in the first operation mode selected by the system controller may be lower than a second moving speed in the second operation mode. Accordingly, the control system is able to safely move in accordance with the types of the persons who are present in the vicinity of the mobile robot.

In the aforementioned control system, a first moving range of the mobile robot in the first operation mode selected by the system controller may be narrower than a second moving range in the second operation mode. Accordingly, it is possible to preferably set the security level in accordance with the types of the persons who are present in the vicinity of the mobile robot.

In the aforementioned control system, the system controller may select a third operation mode that is different from the second operation mode when the person who belongs to the first group is not present in the vicinity of the mobile robot but the density of the persons who belong to the second group in the vicinity of the mobile robot is higher than a predetermined density. Accordingly, the control system is able to preferably select a safe movement method in accordance with the situations of the persons who are present in the vicinity of the mobile robot.

In the aforementioned control system, a range of an area in the vicinity of the mobile robot detected by the feature detection unit may be predetermined in accordance with the position where the mobile robot is present. Accordingly, the control system is able to preferably set conditions for setting the operation mode in accordance with the place where the mobile robot is present.

A control method according to one aspect of the present disclosure is a control method for controlling an operation mode of a mobile robot that autonomously moves in a predetermined area, the control method including: a feature detection step for detecting features of a person who is present in the vicinity of the mobile robot; a classification step for classifying the person into a predetermined first group or a predetermined second group based on the features; and a control step for selecting a first operation mode when the person who belongs to the first group is present in the vicinity of the mobile robot and selecting a second operation mode that is different from the first operation mode when the person who belongs to the first group is not present in the vicinity of the mobile robot, thereby controlling the mobile robot.

With this configuration, the control method controls the operation mode of the mobile robot in accordance with the person who is present in the vicinity of the mobile robot. Accordingly, the mobile robot performs operations different from one another in accordance with the surrounding environment.

A program according to one aspect of the present disclosure causes a computer to execute a control method for controlling an operation mode of a mobile robot that autonomously moves in a predetermined area, the aforementioned control method including: a feature detection step for detecting features of a person who is present in a surrounding environment of the mobile robot; a classification step for classifying the person into a predetermined first group or a predetermined second group based on the features; and a control step for selecting a first operation mode when the person who belongs to the first group is present in the surrounding environment and selecting a second operation mode that is different from the first operation mode when the person who belongs to the first group is not present in the surrounding environment, thereby controlling the mobile robot.

With this configuration, the program controls the operation mode of the mobile robot in accordance with the person who is present in the surrounding environment. Accordingly, the mobile robot performs operations different from one another in accordance with the surrounding environment.

According to the present disclosure, it is possible to provide a control system and the like that preferably set the operation of the mobile robot in accordance with the surrounding environment.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 5 is a table showing an example of staff information;
FIG. 6 is a table showing an example of operation modes;
FIG. 9 is a table showing an example of operation modes according to a second embodiment.

DESCRIPTION OF EMBODIMENTS

Hereinafter, the present disclosure will be explained through embodiments of the present disclosure. However, they are not intended to limit the scope of the present disclosure according to the claims. Further, all of the components/structures described in the embodiments are not necessarily indispensable as means for solving the problem. For clarifying the explanation, the following description and the drawings are partially omitted and simplified as appropriate. The same symbols are assigned to the same elements throughout the drawings and duplicated explanations are omitted as appropriate.

First Embodiment

Figure 1:
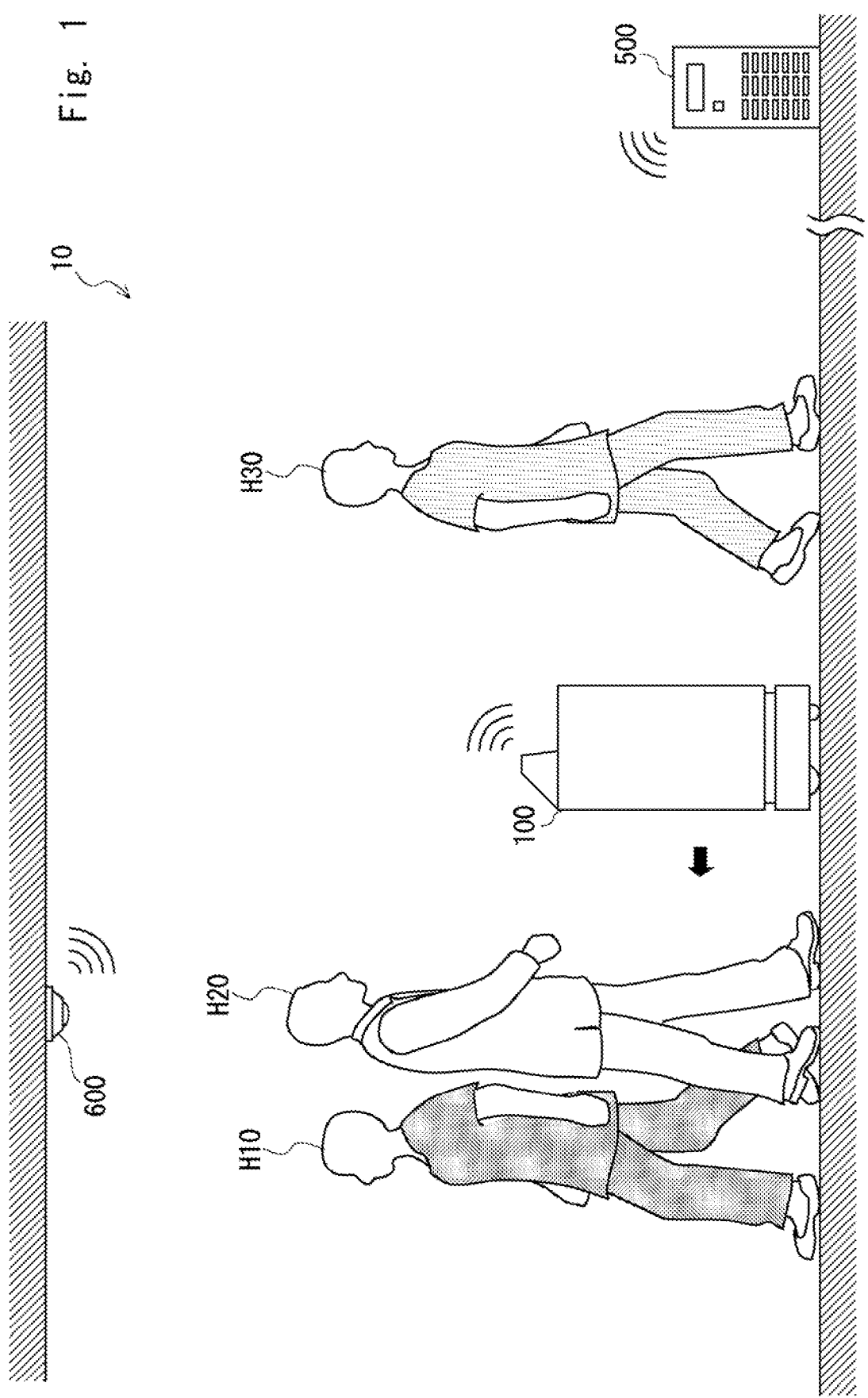
FIG. 1 is an overview diagram of a control system according to a first embodiment.

Hereinafter, with reference to the drawings, a first embodiment will be described. In a control system according to the first embodiment, a conveyance robot that autonomously moves in a predetermined area accommodates conveyed objects and autonomously moves. FIG. 1 is an overview diagram of a conveyance system according to the first embodiment. A control system 10 shown in FIG. 1 is one embodiment of the control system. The control system 10 includes, as its main components, a mobile robot 100, a server 500, and a camera 600.

The mobile robot 100 is one embodiment of a mobile robot that autonomously moves in a predetermined facility. The mobile robot 100 conveys medicines, medical equipment, specimens or the like in a facility such as a hospital. That is, it can be said that the mobile robot 100 is a conveyance robot that conveys predetermined objects.

The server 500 is a computer provided in a desired place. The server 500, which is connected to the mobile robot 100 and the camera 600 in such a way that they can communicate with each other wirelessly, is a control apparatus that controls the mobile robot 100.

The camera 600 is fixed onto the ceiling surface of the place where the mobile robot 100 passes in the facility and captures images of the scenery below the camera 600 from the fixed place. Accordingly, the camera 600 is able to capture images of the mobile robot 100, objects or persons in an area in the vicinity of the mobile robot 100 from a position separated from the mobile robot 100.

In FIG. 1, the mobile robot 100 is moving along the hospital corridor in the direction indicated by the arrow. A person H10, a person H20, and a person H30 are present in the vicinity of the mobile robot 100. The person H10, who is a hospital staff member, is a nurse. The person H20, who is a general person who visits the hospital, is a non-staff member. The person H30, who is a hospital staff member, is a pharmacist.

As described above, the mobile robot 100 moves in an environment in which both hospital staff members and non-staff members are present in such a way that it does not contact these persons. Specifically, the mobile robot 100 moves at such a speed that it does not contact persons who are present in the vicinity of the mobile robot 100, and further reduces its speed or stops when an object is present within a predetermined distance. Further, the mobile robot 100 is able to avoid an object by autonomous movement or issues voices or light for notifying persons in the vicinity of the mobile robot 100 of the presence of the mobile robot 100.

Figure 2:
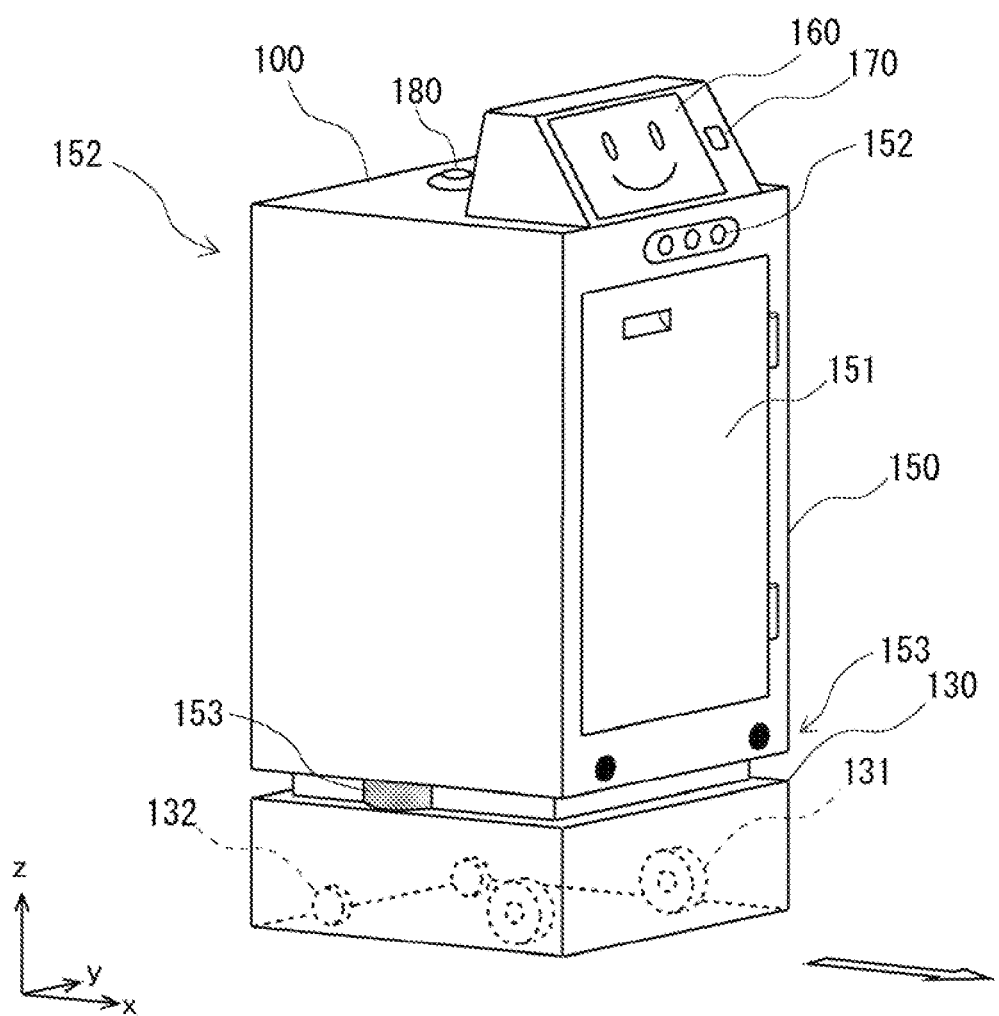
FIG. 2 is an overview diagram of a mobile robot.

Referring to FIG. 2, the mobile robot 100 will be described. FIG. 2 is an overview diagram of the mobile robot 100. In FIG. 2, a right-handed orthogonal coordinate system is shown for the sake of convenience for explaining a positional relation among components.

The mobile robot 100 is a mobile body including a main body having a rectangular parallelepiped shape moving on a floor surface, which is a movement surface. The mobile robot 100 includes a drive unit 130 as moving means. The drive unit 130 includes two driving wheels 131 that contact the floor surface and is configured to be able to independently rotate about one rotation axis extending in the right angle direction (right-left direction or the y-axis direction in FIG. 2) with respect to the straight forward direction (front-back direction or the x-axis direction in FIG. 2) and casters 132 that contact the floor surface. The mobile robot 100 moves forward or backward by driving the right and left driving wheels 131 at the same rotational speed and turns by driving the right and left driving wheels 131 at different rotational speeds or in different rotational directions.

The mobile robot 100 includes a housing part 150 above the drive unit 130. The housing part 150 includes an accommodation room door 151. When the accommodation room door 151 is opened, an accommodation room for accommodating predetermined conveyed objects is provided inside the housing part 150.

A front-back distance sensor 152 is provided in each of the upper part of the accommodation room door 151 of the housing part 150 and on the surface that is opposite to the surface where the accommodation room door 151 is provided (i.e., each of the surfaces of the mobile robot 100 in the front-back direction). The front-back distance sensors 152 detect an object in the vicinity of the mobile robot 100, thereby being able to detect the distance between the mobile robot 100 and this object. The front-back distance sensors 152 measure, for example, the distance between the mobile robot 100 and the object included in the image data of images captured using a stereo camera and an infrared scanner. A right-left distance sensor 153 is provided in a lower part of each of the surfaces of the housing part 150 in the right-left direction. The right-left distance sensors 153, which are distance measurement sensors that use laser light, millimeter waves, or infrared light or the like, are able to detect the distance between the mobile robot 100 and an object in the vicinity of the mobile robot 100. Since the front-back distance sensor 152 is provided in each of the surfaces of the housing part 150 in the front-back direction and the right-left distance sensor 153 is provided in each of the surfaces of the housing part 150 in the right-left direction, the mobile robot 100 is able to detect its distance from an object in all directions.

The mobile robot 100 sets a safe distance regarding the distance from the obstacle detected by the aforementioned distance sensors. The mobile robot 100 controls the autonomous movement of the mobile robot 100 in such a way that the distance between the obstacle and the mobile robot 100 becomes larger than the safe distance. Further, when the distance between the obstacle and the mobile robot 100 has become smaller than the safe distance, the mobile robot 100 temporarily stops the movement of the mobile robot 100 or issues a warning for an obstacle.

A rectangular projection is provided on the upper surface of the housing part 150, and a display unit 160 is disposed in the projection. The display unit 160, which is, for example, a display unit including a liquid crystal panel, displays various kinds of information of the mobile robot 100. The display unit 160 is provided with a touch panel that accepts an operation from the user.

An ID sensor 170 is provided in the vicinity of the display unit 160. The ID sensor 170, which is a sensor for identifying Identification (ID) of the user who operates the mobile robot 100, detects a unique identifier included in an ID card owned by each user. The ID sensor 170 includes, for example, an antenna for reading information on a radio tag. The user brings the ID card close to the ID sensor 170, thereby causing the mobile robot 100 to recognize the ID of the user, who is an operator.

A robot camera 180 is also provided on the upper surface of the housing part 150. The robot camera 180 includes an objective lens that is opposed to an area whose images are to be captured, an image sensor for generating image data of images to be captured and the like. The robot camera 180 is provided so as to capture images of an area above the mobile robot 100. Accordingly, the mobile robot 100 is able to capture images, for example, of the ceiling of the building where the mobile robot 100 moves. When the display for specifying the location is shown on the ceiling, the mobile robot is able to capture images of the display on the ceiling to recognize information included in the display.

Figure 3:
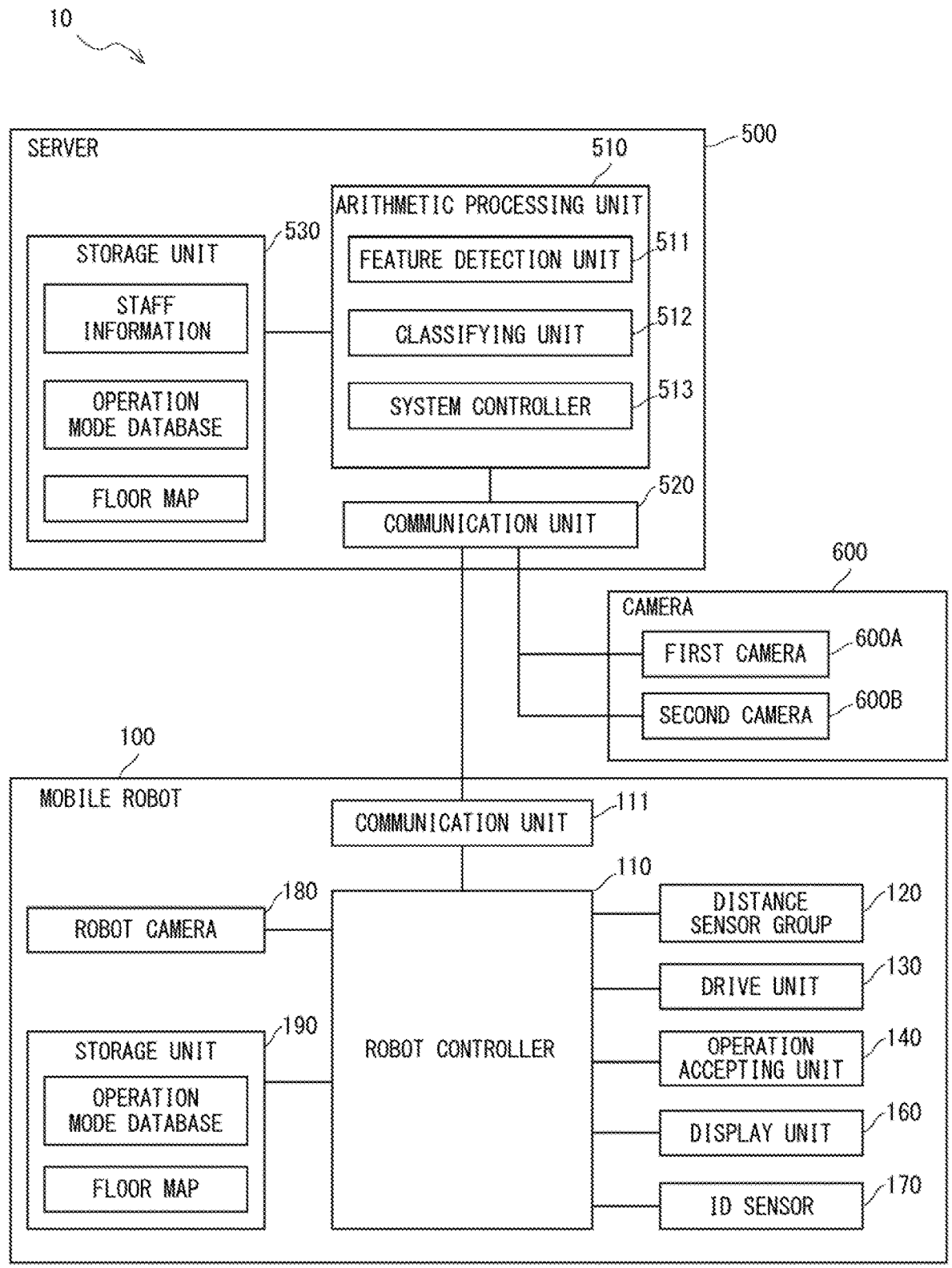
FIG. 3 is a block diagram of the control system according to the first embodiment.

Referring next to FIG. 3, a system configuration of the control system 10 will be described. FIG. 3 is a block diagram of the control system 10. The control system 10 includes, as its main components, the mobile robot 100, the server 500, and the camera 600.

Hereinafter, the system configuration of the mobile robot 100 will be described. The mobile robot 100 includes, as its main components, a robot controller 110, a distance sensor group 120, a drive unit 130, an operation accepting unit 140, a display unit 160, an ID sensor 170, a robot camera 180, and a storage unit 190.

The robot controller 110 is an information processing apparatus including an arithmetic unit such as a Central Processing Unit (CPU). The robot controller 110 includes hardware included in the robot controller 110 and a program stored in the hardware. That is, the processing executed by the robot controller 110 is achieved either by hardware or software.

The robot controller 110 is connected to each of the components of the mobile robot 100 and controls various operations. The robot controller 110 accepts, for example, an instruction for the mobile robot 100 to execute a predetermined task. Further, the robot controller 110 acquires various kinds of information from each of the components and sends an instruction to each of the components in accordance with the acquired information. The robot controller 110 detects, for example, the position of the mobile robot 100 from the information on the position acquired from the robot camera 180 and information on the object in the vicinity of the mobile robot 100 acquired from the distance sensor group 120. Then the robot controller 110 calculates the path from the detected position to the destination and sends an instruction for making a movement along the path to the drive unit 130 in accordance with the calculated path. When this processing is executed, the controller 113 refers to the information regarding a floor map stored in the storage unit 190.

Further, the robot controller 110 follows the instruction from the server 500 received via a communication unit 111. For example, the robot controller 110 performs an operation by an operation mode instructed by the server 500. When the robot controller 110 has received an instruction regarding the operation mode from the server 500, the robot controller 110 refers to an operation mode database stored in the storage unit 190.

The distance sensor group 120 is a plurality of sensors that acquire data of the distance between the mobile robot 100 and an object in the vicinity of the mobile robot 100. The distance sensor group 120 includes the front-back distance sensors 152 and the right-left distance sensors 153 shown in FIG. 2. Each of the sensors included in the distance sensor group 120 supplies the distance data detected by each of these sensors to the robot controller 110. The drive unit 130 is connected to the robot controller 110 and drives the driving wheels 131 upon receiving an instruction from the robot controller 110.

The operation accepting unit 140 accepts an input operation from the user and transmits an operation signal to the robot controller 110. As means for accepting the input operation from the user, the operation accepting unit 140 includes, for example, an operation button or a touch panel disposed over the display unit 160. The user turns on/off a power supply, inputs a task, or performs an operation of opening/closing the accommodation room door 151 by operating the above-described input operation means.

The display unit 160 is connected to the robot controller 110 and displays the image data received from the robot controller 110. When the operation accepting unit 140 accepts an operation by the touch panel disposed over the display unit 160, the display unit 160 displays the content in conjunction with the operation accepting unit 140.

The ID sensor 170 is connected to the robot controller 110 and supplies the detected signal to the robot controller 110. The robot camera 180 is connected to the robot controller 110 and supplies the captured image data to the robot controller 110.

The storage unit 190, which includes a nonvolatile memory such as a flash memory or a Solid State Drive (SSD), stores, for example, an operation mode database regarding the operation mode and a floor map. The storage unit 190 is connected to the robot controller 110 and supplies the stored information to the robot controller 110 in accordance with a request from the robot controller 110.

Next, a system configuration of the server 500 will be described. The server 500 includes, as its main components, an arithmetic processing unit 510, a communication unit 520, and a storage unit 530. The arithmetic processing unit 510 is an information processing apparatus including an arithmetic unit such as a CPU. The arithmetic processing unit 510 includes hardware included in the arithmetic processing unit 510 and a program stored in the hardware. That is, the processing executed by the arithmetic processing unit 510 is implemented either by hardware or software. The arithmetic processing unit 510 includes a feature detection unit 511, a classifying unit 512, and a system controller 513.

The feature detection unit 511 receives image data from the camera 600 and processes the received image data, thereby detecting the features of persons who are present in the vicinity of the mobile robot. The feature detection unit 511 supplies information regarding features of the detected persons to the classifying unit 512.

The classifying unit 512 receives information regarding the features of the persons detected by the feature detection unit 511 and classifies the persons into a plurality of predetermined groups. The classifying unit 512 acquires information regarding the plurality of groups from staff information stored in the storage unit 530. That is, when the classifying unit 512 reads out the staff information from the storage unit 530, the classifying unit 512 compares the staff information that has been read with the information regarding the features of the persons received from the feature detection unit 511 and classifies the persons included in the image data into the plurality of predetermined groups. After the classifying unit 512 classifies the persons included in the image data, the classifying unit 512 supplies the information regarding the results of the classification to the system controller 513.

The classifying unit 512 according to this embodiment classifies each of the persons included in the image data into one of a first group and a second group. The first group is a group of persons who are not hospital staff members. The second group is a group of persons that are recognized as hospital staff members.

The system controller 513 receives the information regarding the results of the classification from the classifying unit 512 and controls the operation of the mobile robot 100 from the received information. The system controller 513 selects a first operation mode when, for example, a person who belongs to the first group is present in the vicinity of the mobile robot 100. Further, the system controller 513 selects a second operation mode different from the first operation mode when, for example, a person who belongs to the first group is not present in the vicinity of the mobile robot 100. Then the system controller 513 controls the mobile robot 100 by the first operation mode or the second operation mode that has been selected as above. Note that specific examples of the first operation mode and the second operation mode will be described later.

The communication unit 520, which is an interface connected to the mobile robot 100 and the camera 600 in such a way that they can communicate with each other, is formed of, for example, an antenna, a circuit that performs modulation or demodulation of a signal transmitted via the antenna or the like.

The storage unit 530, which includes a nonvolatile memory such as a flash memory or a Solid State Drive (SSD), stores, for example, the staff information, the operation mode database, and the floor map. The storage unit 530 is connected to the arithmetic processing unit 510 and supplies the stored information to the arithmetic processing unit 510 in accordance with the request from the arithmetic processing unit 510.

The staff information includes information for classifying persons included in the image data into the first group or the second group. The operation mode database includes information for controlling the mobile robot 100 from the results of the classification processed by the classifying unit 512. The details of the staff information and the operation mode database will be described later.

The floor map is a map of the facility that the mobile robot 100 uses for autonomous movement. The floor map includes information on areas that are candidates for a route through which the mobile robot 100 autonomously moves, information on a check point that the mobile robot 100 passes and the like.

Next, a system overview of the camera 600 will be described. The camera 600 includes a first camera 600A and a second camera 600B. In the following description, it is assumed that the camera 600 is a collective term for the first camera 600A and the second camera 600B. The camera 600, which can communicate with the server 500 by wireless communication, transmits the image data generated by capturing images to the server 500. The camera 600 transmits, for example, the image data of 30 frames per second (30 fps)

to the server. The camera 600 may include another camera in addition to the first camera 600A and the second camera 600B.

Figure 4:
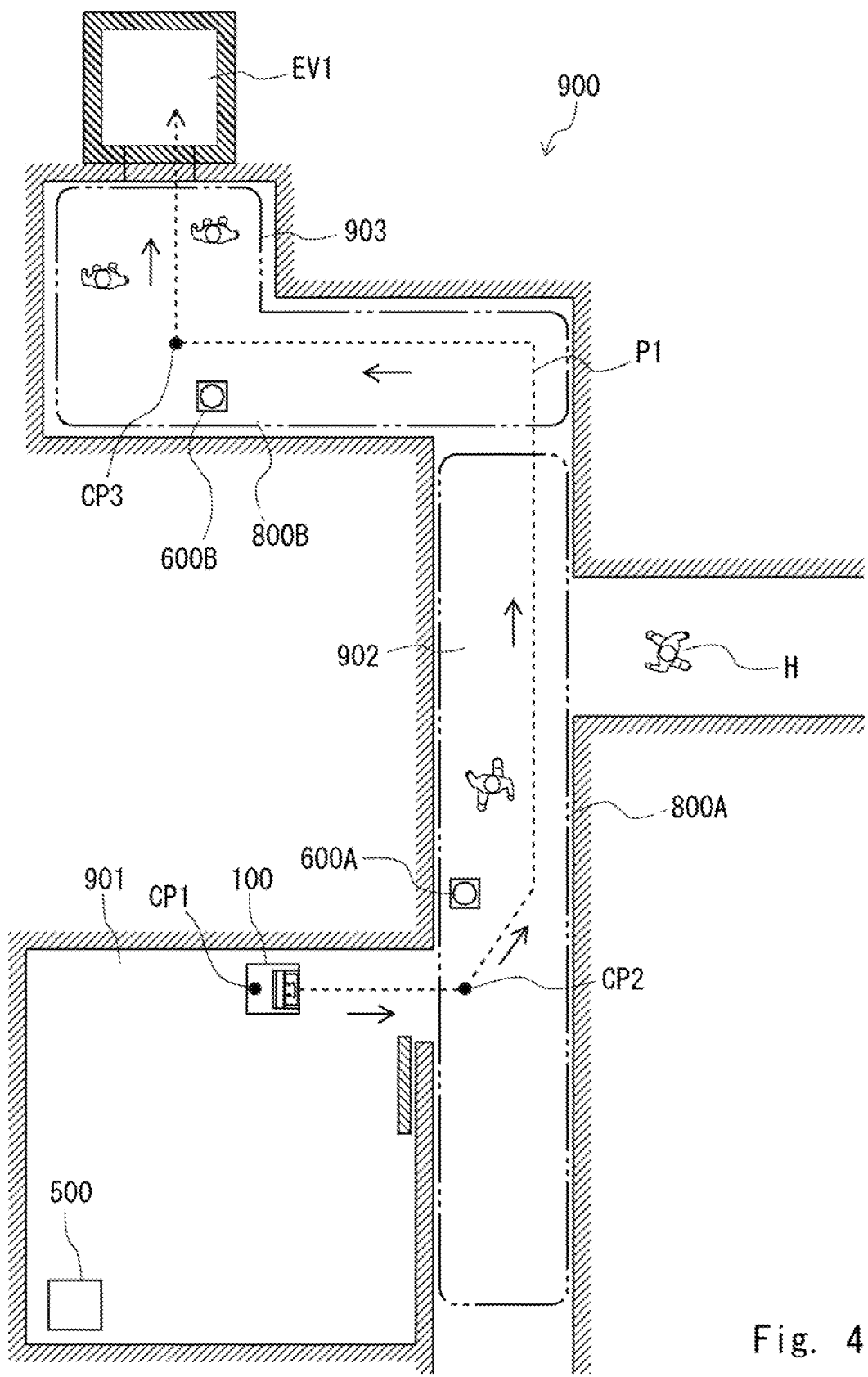
FIG. 4 is a diagram showing an example of a path along which the mobile robot passes.

Referring next to FIG. 4, an example of the moving path of the mobile robot 100 and the arrangement of the camera 600 will be described. FIG. 4 is a diagram showing an example of the path along which the mobile robot passes. FIG. 4 is a plan view of one floor in a building 900, which is a facility of the hospital. The building 900 includes a room 901, a passage 902, and an elevator hall 903. The building 900 is equipped with an elevator EV1. The room 901 is connected to the elevator EV1 via the passage 902 and the elevator hall 903.

A check point CP1 is provided in a predetermined place in the room 901. A check point CP2 is provided in a passage 902 near the doorway of the room 901. Further, a check point CP3 is provided in the central part of the elevator hall 903. The check points CP1-CP3 are means for notifying, upon being detected by the mobile robot 100, the server 500 that the mobile robot 100 has passed through or arrived at the check points. The check points CP1-CP3 are, for example, unique character information indicating the respective positions thereof, and are fixed to the ceiling at the respective positions in such a way that the robot camera 180 is able to capture images of the character information. As shown in FIG. 4, the mobile robot 100 is positioned under the check point CP1 arranged in the room 901 of the building 900. The server 500 is arranged in the room 901.

The first camera 600A and the second camera 600B are respectively provided on the ceiling surface of the passage 902 and the ceiling surface of the elevator hall 903. The first camera 600A includes an image-capturing range 800A shown by an alternate long and two short dashes line. The second camera 600B includes an image-capturing range 800B shown by an alternate long and two short dashes line. Further, a plurality of persons H are walking in each of the passage 902 and the elevator hall 903.

In the aforementioned situation, the mobile robot 100 receives an instruction from the server 500 to depart, for example, the check point CP1, get on the elevator EV1, and move on the floor. In this case, the mobile robot 100 refers to the floor map stored in the storage unit 190, extracts the following moving instruction from the aforementioned instruction, and generates a moving path P1. First, the mobile robot 100 moves from the check point CP1 to the check point CP2. Next, the mobile robot 100 moves to the elevator hall 903 from the check point CP2 through the passage 902, and waits for the elevator at the check point CP3. Then when the elevator EV1 arrives, the mobile robot 100 gets on the elevator EV1 from the check point CP3. The control system 10 detects, when the mobile robot 100 moves along the moving path P1, the person from the image data generated by capturing images of an area in the vicinity of the mobile robot 100, and sets the operation mode in accordance with the aspect of the detected person.

Referring next to FIG. 5, the staff information stored in the storage unit 530 will be described. The staff information is information for classifying staff members and non-staff members into groups for each type. FIG. 5 is a table showing an example of the staff information. A table T10 shown in FIG. 5 is the staff information stored in the storage unit 530. The left column of the table T10 shows a "staff category". The items of the staff category are, from the top to the bottom, a "non-staff", a "pharmacist", and a "nurse". The right column of the staff category shows, from the top to the bottom, "color of clothing", "group classification", and an "operation mode".

Hereinafter, the color of the clothing (color tone), the group classification, and the operation mode that correspond to each item of the staff category will be described. The color of the clothing that corresponds to a "non-staff" is "unspecified". That is, when the feature detection unit 511 has detected a person from the image data but the color of the clothing of the detected person is not included in the predetermined ones, the feature detection unit 511 determines that the detected person is a "non-staff". Further, according to the table T10, the group classification that corresponds to the "non-staff" is a "first group (N1)" and the operation mode is the "first operation mode". The first operation mode is also referred to as a "non-staff mode".

When it has been determined that the person detected by the feature detection unit 511 is a non-staff member, the control system 10 defines that this person belongs to the first group. Further, the control system 10 associates the first operation mode (non-staff mode) with the first group.

Next, the color of the clothing that corresponds to a "pharmacist" is "yellow". That is, the feature detection unit 511 determines that the detected person is a "pharmacist" when it has been determined that the clothing of the detected person is yellow. Further, according to the table T10, the group classification that corresponds to the "pharmacist" is the "second group (N2)" and the operation mode is the "second operation mode". The second operation mode is also referred to as a "staff mode".

When it has been determined that the person detected by the feature detection unit 511 is a pharmacist, the control system 10 defines that this person belongs to the second group. Further, the control system 10 associates the second operation mode (staff mode) with the second group.

Next, the color of the clothing that corresponds to a "nurse" is "violet". That is, when it has been determined that the clothing of the detected person is violet, the feature detection unit 511 determines that the detected person is a "nurse". Further, according to the table T10, the group classification that corresponds to the "nurse" is the "second group (N2)" and the operation mode is the "second operation mode". That is, when it has been determined that the person detected by the feature detection unit 511 is a nurse, the control system 10 defines that this person belongs to the second group. Further, the control system 10 associates the second operation mode with the second group.

Referring next to FIG. 6, the operation mode database stored in the storage unit 530 will be described. The operation mode database is information in which the specific aspect of operation modes that have been defined is associated. FIG. 6 is a table indicating an example of the operation modes.

A table T20 shown in FIG. 6 indicates the content of the operation mode database stored in the storage unit 530. In the table T20, the left column shows the "operation category". The items of the operation category are a "moving speed" and an "elevator". The right column of the operation category shows the specification of the first operation mode that corresponds to each of the operation category items. Further, the right column of the first operation mode shows the specification of the second operation mode that corresponds to each of the operation category items.

According to the table T20, the moving speed of the first operation mode is a first moving speed V1 and the moving speed of the second operation mode is a second moving speed V2. The first moving speed V1 is slower than the second moving speed V2. That is, the mobile robot 100 in the first operation mode moves at the first moving speed V1 slower than the second moving speed V2. Further, the mobile robot 100 in the second operation mode moves at the second moving speed V2 faster than the first moving speed V1. The reason why the first moving speed V1 in the first operation mode is set to be slower than the second moving speed V2 in the second operation mode is that there is a non-staff member in the vicinity of the mobile robot 100 in the first operation mode.

By setting the moving speed in the first operation mode (non-staff mode) to be slower than the moving speed in the second operation mode (staff mode), the control system 10 is able to prevent an impact of the mobile robot 100 with non-staff members and operate the mobile robot 100 more safely. On the other hand, the control system 10 is able to set the moving speed relatively quickly and increase the operation efficiency of the mobile robot 100 in the second operation mode (staff mode).

Further, according to the table T20, the mobile robot 100 "cannot get on" the elevator in the first operation mode and "can get on" the elevator in the second operation mode. That is, when a non-staff member is present in the vicinity of the mobile robot 100, the control system 10 does not allow the mobile robot 100 to get on the elevator. In other words, the mobile robot 100 is able to move in a first moving range in the first operation mode and the mobile robot 100 is able to move in a second moving range in the second operation mode. In this case, the "first moving range" does not include an elevator and the "second moving range" includes an elevator. Therefore, the first moving range is narrower than the second moving range.

Note that the control system 10 is able to change the operation mode and cause the mobile robot 100 to get on the elevator after there are no more non-staff members in an area in the vicinity of the mobile robot 100. With this configuration, the control system 10 is able to operate the mobile robot 100 without reducing the security level even under the environment in which both a staff member and a non-staff member are present.

Figure 7:
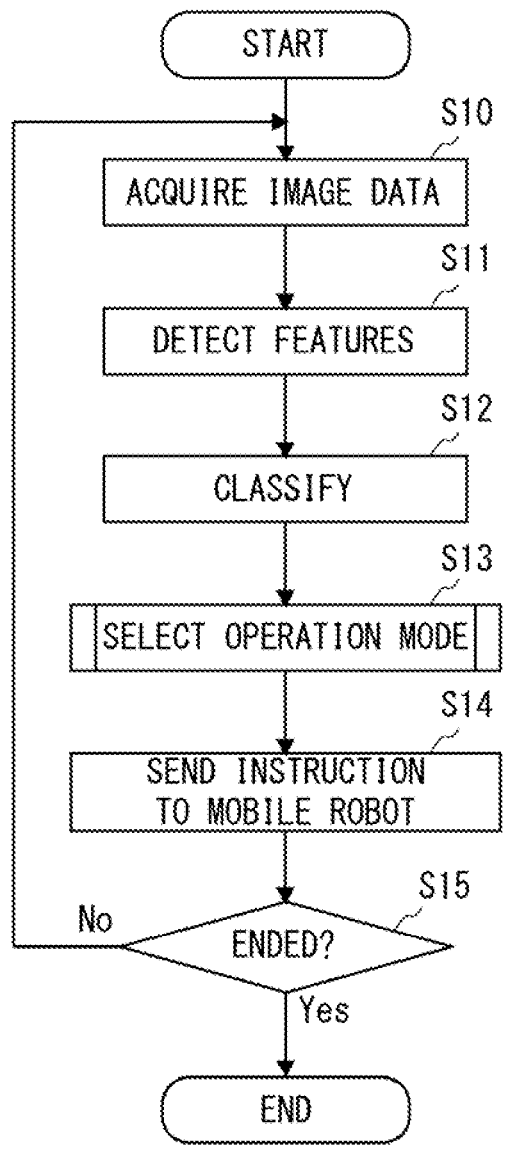
FIG. 7 is a flowchart showing processing of the control system according to the first embodiment.

Referring next to FIG. 7, processing performed by the control system 10 will be described. FIG. 7 is a flowchart showing the processing of the control system according to the first embodiment. The flowchart shown in FIG. 7 shows the processing performed by the arithmetic processing unit 510 of the control system 10. The flowchart shown in FIG. 7 is started, for example, when the mobile robot 100 shown in FIG. 4 starts execution of a task of moving from the check point CP1 to the elevator EV1.

First, the arithmetic processing unit 510 acquires the image data from the camera 600 (Step S10). Upon receiving the image data, the arithmetic processing unit 510 supplies the acquired image data to the feature detection unit 511.

Next, the feature detection unit 511 detects features of the person included in the image data from the received image data (Step S11). More specifically, the feature detection unit 511 detects whether or not there is a person in the vicinity of the mobile robot 100. As means for detecting that the image data includes a person, various techniques such as Histograms of Oriented Gradients (HOG) feature amount or machine learning including convolution processing have been known to those skilled in the art. Therefore the detailed explanation thereof will be omitted here.

Next, the feature detection unit 511 detects the color of the clothing of the detected person. More specifically, the feature detection unit 511 calculates, for example, the percentage of an area of the clothing of the detected person having a specific color. Alternatively, the feature detection unit 511 detects the color of a specific part of the clothing of the detected person. In this way, the feature detection unit 511 extracts a characteristic of a part of the clothing of staff members. Then the feature detection unit 511 supplies the extracted information to the classifying unit 512.

Next, the classifying unit 512 classifies the detected person from the information received from the feature detection unit 511 and the staff information stored in the storage unit 530 (Step S12). The classifying unit 512 supplies the results of the classification to the system controller 513.

Next, the system controller 513 selects the operation mode from the results of the classification received from the classifying unit 512 and the operation mode database stored in the storage unit 530 (Step S13).

Next, the system controller 513 sends an instruction to the mobile robot 100 using the selected operation mode (Step S14). For example, the system controller 513 sends an instruction regarding the moving speed to the mobile robot 100. Alternatively, the system controller 513 sends an instruction regarding whether or not the mobile robot 100 is able to get on the elevator to the mobile robot 100.

Next, the arithmetic processing unit 510 determines whether or not a series of processes has ended (Step S15). When it is not determined that the series of processes has ended (Step S15: No), the arithmetic processing unit 510 goes back to Step S10 and repeats the processes. On the other hand, when it has been determined that the series of processes has ended (Step S15: Yes), the arithmetic processing unit 510 ends the processing.

Figure 8:
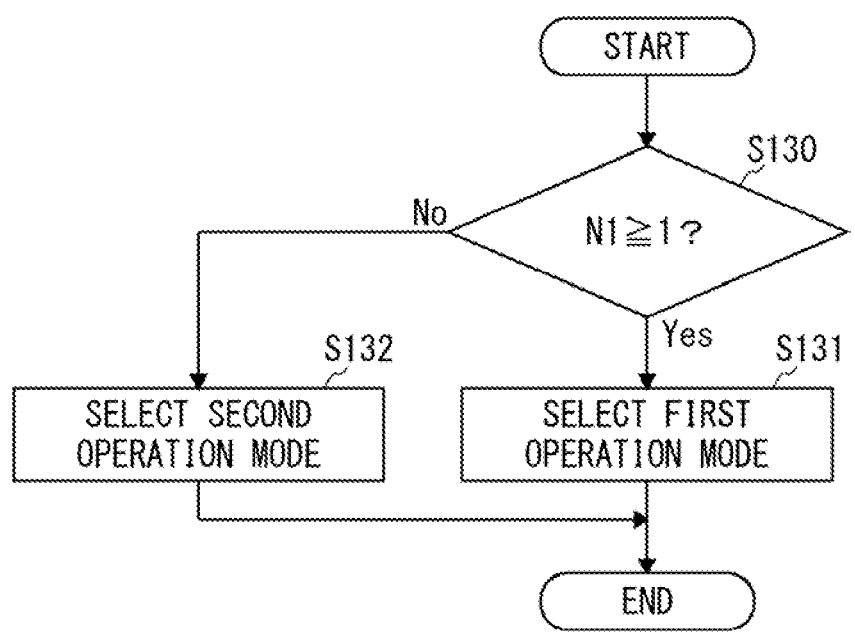
FIG. 8 is a diagram showing an example of processing of selecting the operation mode according to the first embodiment.

Next, FIG. 8 shows the details of the processing in the above Step S13. FIG. 8 is a diagram showing an example of the processing of selecting the operation mode according to the first embodiment. The flowchart shown in FIG. 8 shows processing performed by the system controller 513.

First, the system controller 513 determines whether or not the number of persons (N1) in the first group who are present in the vicinity of the mobile robot 100 is equal to or larger than one (Step S130). When it is not determined that N1≥1 (Step S130: No), the system controller 513 selects the second operation mode (staff mode) as the operation mode (Step S132). On the other hand, when it is determined that N1≥1 (Step S130: Yes), the system controller 513 selects the first operation mode (non-staff mode) as the operation mode (Step S131).

The processing performed by the control system 10 has been described above. With the aforementioned processing, the control system 10 controls the operation mode of the mobile robot in accordance with the persons who are present in the vicinity of the mobile robot.

While the first embodiment has been described above, the configuration of the control system 10 according to the first embodiment is not limited to the aforementioned one. For example, the ranges of an area in the vicinity of the mobile robot 100 captured by the cameras 600 included in the control system 10 may overlap each other. In this case, the arithmetic processing unit 510 may select the operation mode by processing the image data obtained by capturing images of an area in the vicinity of the mobile robot 100 from the plurality of cameras 600. With this configuration, the control system 10 is able to capture images of an area in the vicinity of the mobile robot 100 without blind spots and preferably select the operation mode.

Further, the control system 10 may detect the person who is present in the vicinity of the mobile robot 100 by acquiring image data from the camera 600 and a camera included in the mobile robot 100. Further, the control system 10 may detect the person who is present in the vicinity of the mobile robot 100 using the camera included in the mobile robot 100 in place of the camera 600.

Further, the control system 10 may set, as the operation mode, whether or not the automatic door can be opened/closed in addition to the elevator or in place of the elevator. Accordingly, the control system 10 is able to prevent the security level from being reduced in an environment in which both a non-staff member and a staff member are present.

Further, the control system 10 may set, for example, a safe distance during the movement as the operation mode. Alternatively, the control system 10 may set the content or the volume of a warning sound issued to surrounding persons as the operation mode. Accordingly, the control system 10 is able to set the safety standards in the autonomous movement in accordance with the aspect of the person who is present in the vicinity of the mobile robot 100.

The control system 10 may use, as a method of detecting features for classifying persons into staff members and non-staff members, in addition to the clothing of the detected person or in place of the clothing of the detected person, a hat, a helmet, goggles, glasses, a scarf, an armband, a bag, shoes or the like that the detected person wears.

As discussed above, according to the first embodiment, it is possible to provide the control system and the like that preferably set the operation of the mobile robot in accordance with the surrounding environment.

Second Embodiment

Next, a second embodiment will be described. Processing of a system controller in a control system 10 according to the second embodiment is different from that according to the first embodiment. A system controller 513 selects a third operation mode that is different from the second operation mode when there is no person who belongs to the first group (N1=0) in the vicinity of the mobile robot 100 but the density of the persons who belong to the second group in an area in the vicinity of the mobile robot is higher than a predetermined density.

Referring to FIG. 9, an operation mode database according to the second embodiment will be described. FIG. 9 is a table indicating an example of operation modes according to the second embodiment.

A table T30 shown in FIG. 9 indicates the content of the operation mode database stored in the storage unit 530. The table T30 shows, besides the content described in FIG. 6, a "third operation mode (second staff mode)" in the right column. The moving speed in the third operation mode is set to the first moving speed V1 slower than the second moving speed V2. On the other hand, in the third operation mode, the mobile robot 100 is able to get on the elevator. That is, the moving speed in the third operation mode is relatively low although it is the staff mode. Accordingly, the control system 10 prevents contact between the mobile robot 100 and the staff members when there are many staff members in the vicinity of the mobile robot 100.

Figure 10:
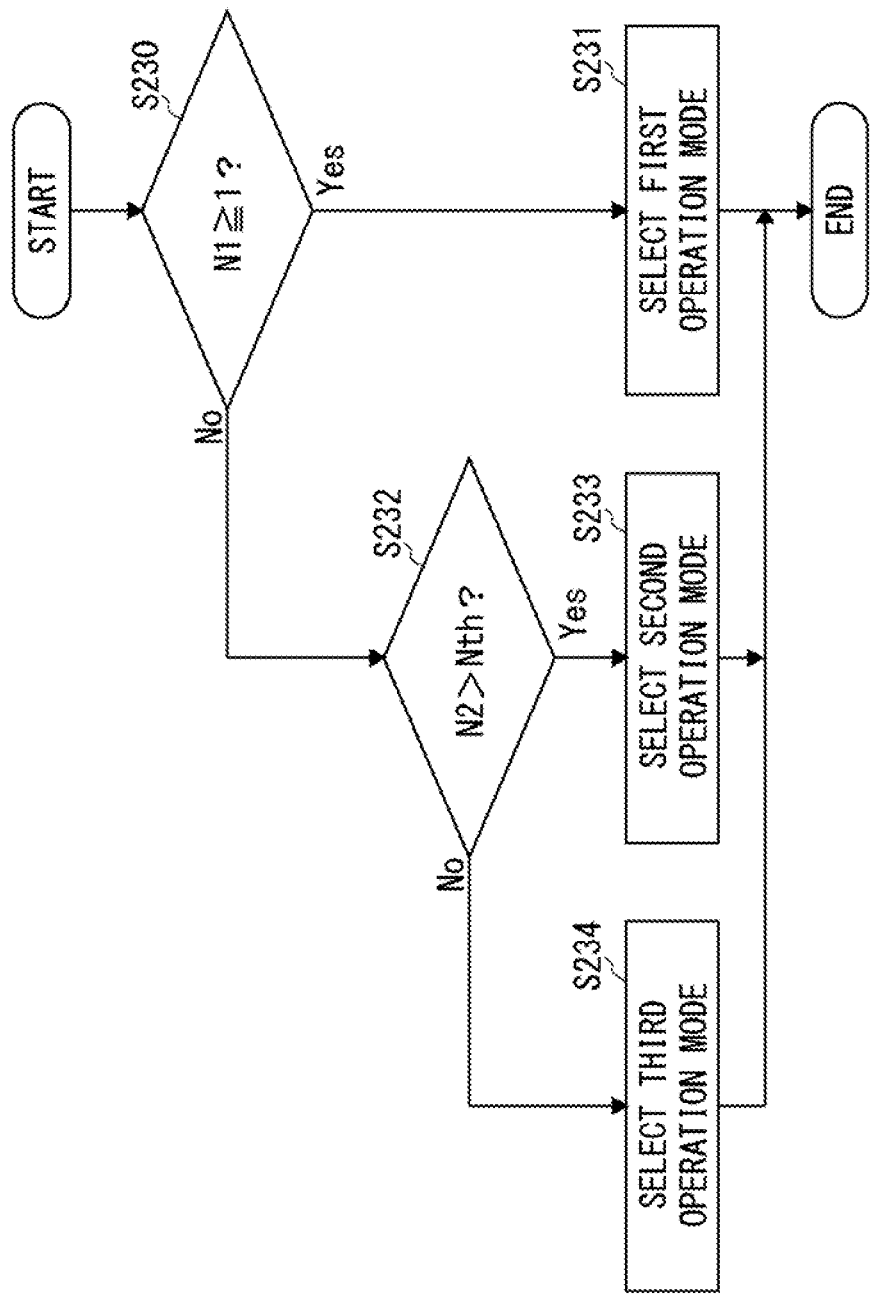
FIG. 10 is a diagram showing an example of processing of selecting the operation mode according to the second embodiment.

Referring next to FIG. 10, processing of selecting the operation mode according to the second embodiment will be described. FIG. 10 is a diagram showing an example of the processing of selecting the operation mode according to the second embodiment. The flowchart shown in FIG. 10 shows the processing performed by the system controller 513. Further, the flowchart shown in FIG. 10 is executed in place of the processing according to the first embodiment described in FIG. 8.

First, the system controller 513 determines whether or not the number of persons (N1) in the first group who are present in the vicinity of the mobile robot 100 is equal to or larger than one (Step S230). When it has not been determined that N1≥1 (Step S230: No), the system controller 513 proceeds to Step S232. On the other hand, when it has been determined that N1≥1 (Step S230: Yes), the system controller 513 selects the first operation mode (Step S231) and ends the selection processing.

In Step S232, the system controller 513 determines whether or not the number of persons (N2) in the second group who are present in the vicinity of the mobile robot 100 is larger than a set threshold (Nth) (Step S232). When it has been determined that N2>Nth (Step S232: Yes), the system controller 513 selects the second operation mode (Step S233) and ends the selection processing. On the other hand, when it has not been determined that N2>Nth (Step S232: No), the system controller 513 selects the third operation mode (Step S234) and ends the processing.

The second embodiment has been described above. The control system 10 according to the second embodiment is able to further classify the staff mode. Therefore, according to the second embodiment, it is possible to provide the control system and the like that set the operation of the mobile robot more finely in accordance with the surrounding environment.

The aforementioned program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above embodiments and may be changed as appropriate without departing from the spirit of the present disclosure. For example, the present disclosure can be used in an environment in which both a staff member and a non-staff member are present in a restaurant, a hotel, an event space, an office, a specific service providing space or the like.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A control system configured to control an operation mode of a mobile robot that autonomously moves in a predetermined facility, the control system comprising:
 a feature detection unit configured to detect features of clothing of a person who is present in the vicinity of the mobile robot;

a classifying unit configured to classify the person into a first group, which is a group of non-staff members of the facility, or a second group, which is a group of staff members of the facility, based on the features of the clothing; and a system controller configured to select a first operation mode when the person who belongs to the first group is present in the vicinity of the mobile robot and select a second operation mode that is different from the first operation mode when the person who belongs to the first group is not present in the vicinity of the mobile robot, thereby controlling the mobile robot, wherein the system controller sets a second moving speed of the mobile robot in the second operation mode to be higher than a first moving speed of the mobile robot in the first operation mode, sets the mobile robot to be unable to get on an elevator in the first operation mode, and sets the mobile robot to be able to get on the elevator in the second operation mode, and when the non-staff member who belongs to the first group is not present in the vicinity of the mobile robot but the density of the staff members who belong to the second group in the vicinity of the mobile robot is higher than a predetermined density, the system controller sets the moving speed to be lower than the second moving speed and selects a third operation mode that is different from the second operation mode where the mobile robot is set to be able to get on the elevator.

2. The control system according to claim 1, further comprising a camera configured to capture images of an area in the vicinity of the mobile robot and generate image data, wherein the feature detection unit detects the features of the clothing of the person from the image data generated by the camera.

3. The control system according to claim 2, wherein the camera is provided in a position that is separated from the mobile robot so as to capture images of the area in the vicinity of the mobile robot.

4. The control system according to claim 3, wherein
the feature detection unit detects a color tone in a predetermined part of the clothing of the person, and
the classifying unit classifies the person in accordance with the color tone.

5. The control system according to claim 1, wherein a first moving range of the mobile robot in the first operation mode selected by the system controller is narrower than a second moving range in the second operation mode.

6. The control system according to claim 1, wherein a range of an area in the vicinity of the mobile robot detected by the feature detection unit is predetermined in accordance with the position where the mobile robot is present.

7. A control method for controlling an operation mode of a mobile robot that autonomously moves in a predetermined facility, the method comprising:
a feature detection step for detecting features of clothing of a person who is present in the vicinity of the mobile robot;
a classification step for classifying the person into a first group, which is a group of non-staff members of the facility, or a second group, which is a group of staff members of the facility, based on the features of the clothing; and
a control step for selecting a first operation mode when the person who belongs to the first group is present in the vicinity of the mobile robot and selecting a second operation mode that is different from the first operation mode when the person who belongs to the first group is not present in the vicinity of the mobile robot, thereby controlling the mobile robot, wherein the control step sets a second moving speed of the mobile robot in the second operation mode to be higher than a first moving speed of the mobile robot in the first operation mode, sets the mobile robot to be unable to get on an elevator in the first operation mode, and sets the mobile robot to be able to get on the elevator in the second operation mode, and when the non-staff member is not present in the vicinity of the mobile robot but the density of the staff members in the vicinity of the mobile robot is higher than a predetermined density, the control step sets the moving speed to be lower than the second moving speed and selects a third operation mode that is different from the second operation mode where the mobile robot is set to be able to get on the elevator.

8. A non-transitory computer readable medium storing a program for causing a computer to execute a control method for controlling an operation mode of a mobile robot that autonomously moves in a predetermined facility, the control method comprising:
a feature detection step for detecting features of clothing of a person who is present in the vicinity of the mobile robot;
a classification step for classifying the person into a first group, which is a group of non-staff members of the facility, or a second group, which is a group of staff members of the facility, based on the features of the clothing; and
a control step for selecting a first operation mode when the person who belongs to the first group is present in the vicinity of the mobile robot and selecting a second operation mode that is different from the first operation mode when the person who belongs to the first group is not present in the vicinity of the mobile robot, thereby controlling the mobile robot, wherein the control step sets a second moving speed of the mobile robot in the second operation mode to be higher than a first moving speed of the mobile robot in the first operation mode, sets the mobile robot to be unable to get on an elevator in the first operation mode, and sets the mobile robot to be able to get on the elevator in the second operation mode, and when the non-staff member is not present in the vicinity of the mobile robot but the density of the staff members in the vicinity of the mobile robot is higher than a predetermined density, the control step sets the moving speed to be lower than the second moving speed and selects a third operation mode that is different from the second operation mode where the mobile robot is set to be able to get on the elevator.

* * * * *